United States Patent [19]

Yamamoto et al.

[11] Patent Number: 4,726,229

[45] Date of Patent: Feb. 23, 1988

[54] MICROSCOPE HAVING AN OPTICAL HEAD AND AN ADDITIONAL HEAD

[75] Inventors: Soji Yamamoto; Mitsugu Sakai; Fumio Uchino; Yuzo Nakamura, all of Hachioji, Japan

[73] Assignee: Olympus Optical Co., Ltd., Japan

[21] Appl. No.: 888,020

[22] Filed: Jul. 22, 1986

Related U.S. Application Data

[63] Continuation-in-part of Ser. No. 664,428, Oct. 24, 1984, Pat. No. 4,621,531.

[30] Foreign Application Priority Data

Nov. 2, 1983 [JP] Japan ................................ 58-204722

[51] Int. Cl.$^4$ ............................................. G01N 29/00
[52] U.S. Cl. ........................................ 73/606; 73/633
[58] Field of Search ................. 73/606, 607, 618, 619, 73/633

[56] References Cited

U.S. PATENT DOCUMENTS

| 4,011,748 | 3/1977 | Bond et al. | 73/618 X |
| 4,446,738 | 5/1984 | Ishikawa | 73/606 |
| 4,611,493 | 9/1986 | Muth | 73/606 |

*Primary Examiner*—Jerry W. Myracle
*Attorney, Agent, or Firm*—Parkhurst & Oliff

[57] ABSTRACT

A microscope having an optical head and an additional head is disclosed. A slide plate on which the additional head and optical head are arranged in such a manner that they are separated by a predetermined spacing in the Y direction is slidably secured to an arm of the microscope. Under such a construction, an observation by a raster image and an optical observation by a optical image can be performed precisely for the same region of a specimen by moving the additional head and optical head integrally by a distance substantially equal to the spacing by means of the slide plate.

15 Claims, 12 Drawing Figures

FIG. 1

FIG_2

FIG_3

FIG_4A

FIG_4B

FIG_5

FIG_6

FIG_7

MICROSCOPE HAVING AN OPTICAL HEAD AND AN ADDITIONAL HEAD

This application is a continuation-in-part of application Ser. No. 664,428, filed Oct. 24, 1984, now U.S. Pat. No. 4,621,531.

BACKGROUND OF THE INVENTION

The present invention relates to an ultrasonic microscope having in addition to an ultrasonic head an optical head, by means of which both ultrasonic observation and optical observation can be selectively performed by changing the heads with the aid of a slide mechanism.

Heretofore, there has been utilized an ultrasonic microscope having both an ultrasonic head including an ultrasonic transducer and an optical head including an objective lens, by means of which ultrasonic and optical images of a specimen can be observed selectively. In the ultrasonic microscope mentioned above, it is often necessary to observe the same region of the specimen both with ultrasonic observation and with optical observation. However in this known ultrasonic microscope, since the objective lens and the ultrasonic head have substantially similar dimensions so that the observation axes of the ultrasonic and optical images can not come close to each other, this results in the disadvantage that the regions observed by the ultrasonic head and by the objective lens are greatly shifted from each other.

In this case, in order to correspond these regions precisely with each other, a very cumbersome operation must be performed such that once observed by one head, the specimen is positioned correctly at a visual field of the other head by moving a specimen stage. However, since the visual field of the ultrasonic wave is very small on the order of 0.1 mm square, high accuracy is required for movement of the specimen stage. Further, since contour configurations of the ultrasonic image and the optical image are usually not identical with each other, registration of the ultrasonic and optical images becomes much more difficult. Therefore, it is extremely difficult to position the region correctly at an observation position by a manual operation while observing the specimen image. Moreover, in order to effect a precise positioning use may be made of a driving device which moves the specimen stage for effecting a sub-scanning operation of the ultrasonic observation. In this case, it is almost impossible to effect precise positioning quickly due to a slow movement of the specimen stage and a low positioning accuracy.

SUMMARY OF THE INVENTION

The present invention has for its object to eliminate the drawbacks mentioned above and to provide an ultrasonic microscope in which an ultrasonic observation and an optical observation can be precisely effected for the same region of a specimen by moving an ultrasonic head and an optical head integrally in a simple manner by means of a slide mechanism.

According to the invention, in an ultrasonic microscope for observing an ultrasonic raster image of a specimen on a monitor by scanning the specimen by vibrating an ultrasonic head in the X direction by a vibrator and by moving a specimen stage in the Y direction on which the specimen is placed, and for observing an optical image of the sample by means of a light source, an eyepiece, and an optical head including an objective lens, the invention further comprises:

a slide plate on which are arranged the ultrasonic head and objective lens which are separated by a predetermined spacing in the Y direction, the slide plate being slidable in the Y direction by a distance substantially equal to the predetermined spacing so as to make the ultrasonic raster image which with said optical image substantially identical.

DESCRIPTION OF THE PREFERRED EMBODIMENTS

Figure 1:
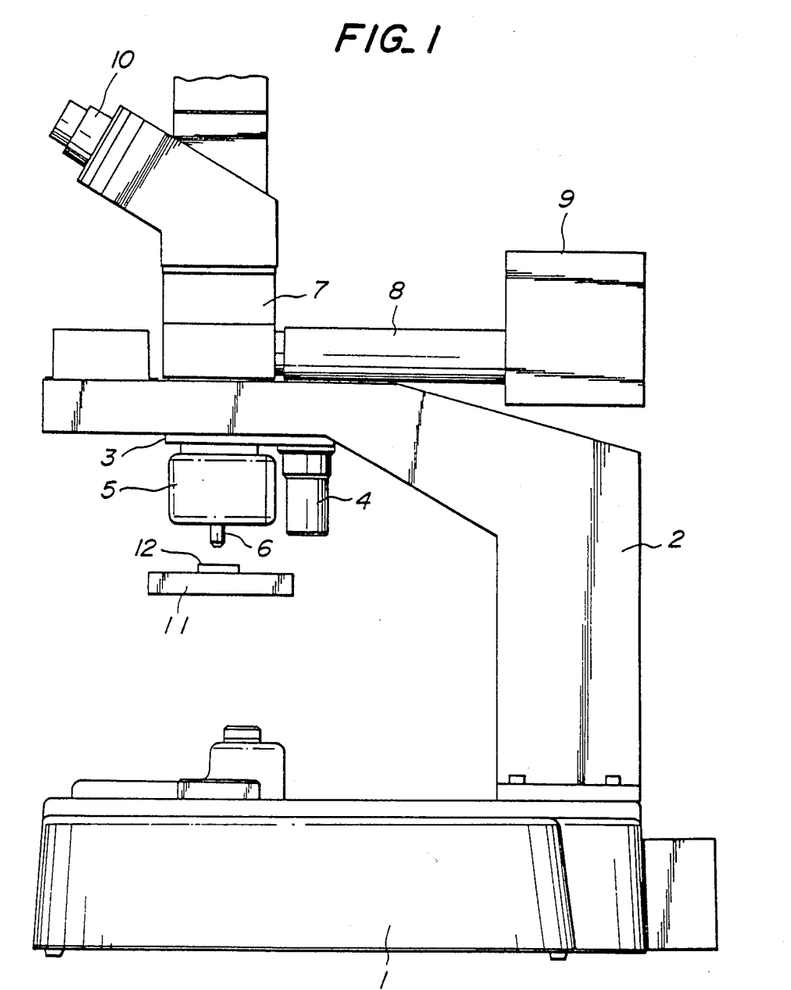
FIG. 1 is a side view showing one embodiment of the ultrasonic microscope according to the invention.
Figure 2:
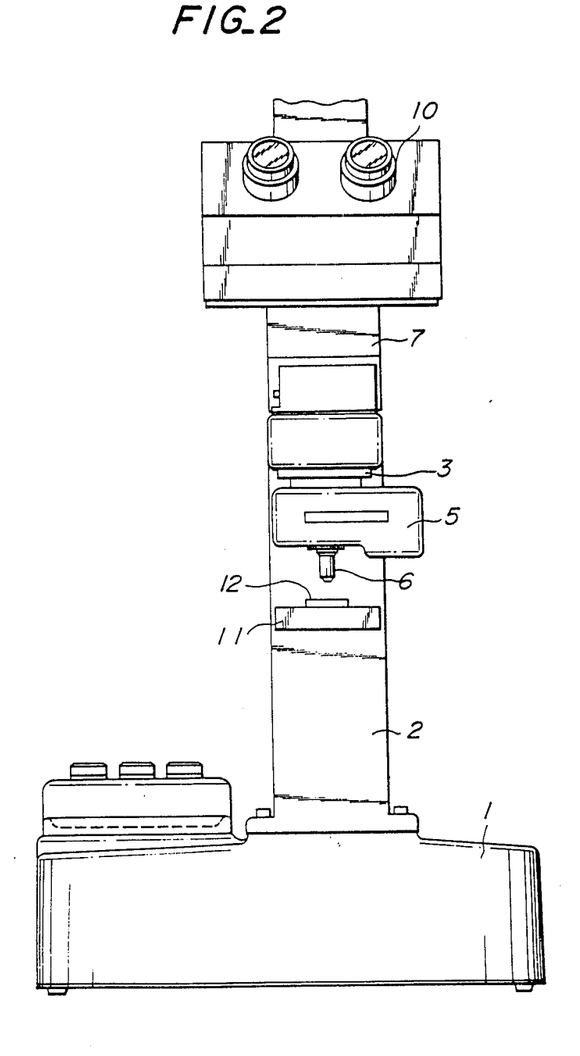
FIG. 2 is a front view of the ultrasonic microscope illustrated in FIG. 1.

FIGS. 1 and 2 are side and front views showing one embodiment of the ultrasonic microscope according to the invention. First, the whole construction of the ultrasonic microscope according to the invention will be explained with reference to FIGS. 1 and 2. In this embodiment, an arm 2 is fixedly secured to a base 1, and a slide plate 3 is secured to the arm 2 slidably in the Y direction. A slidable connection between the slide plate 3 and the arm 2 is realized by dovetail grooves, and a click mechanism (not shown in FIG. 1 or 2) for limiting the slidable movement of the slide plate 3 is provided. An optical head 4 including an objective lens for the optical observation and an ultrasonic head 6 with a vibrator 5 are secured to the slide plate 3 at a predetermined interval along the Y direction. The optical head 4 is detachably arranged to the slide plate 3 so as to observe the specimen 12 at various magnifications. Moreover, a lens-barrel 7 is secured to the arm 2, and also a light source 9 comprising a reflection type illumination system is secured to the arm 2 through a light transmitter 8. Further, a binocular eyepiece 10 is secured to the lens-barrel 7. Under the heads for the purpose of specimen observation is arranged a specimen stage 11 which is movable in the Y direction, and the specimen stage 11 is further connected with a driving device (not shown) for sub-scanning the specimen 12 placed on the stage 11 in the Y direction in case of ultrasonic observation.

Next, observing operations will be explained. When the ultrasonic observation is to be effected, the specimen 12 to be observed is at first placed on the specimen stage 11, and then the slide plate 3 is manually moved into an ultrasonic observating position so that the ultrasonic head 6 moves specimen near an observation axis of the microscope as illustrated in FIG. 1. A vibration in the X direction is applied to the ultrasonic head 6 by means of the vibrator 5 so to effect a main-scanning operation in the X direction (vertical direction with respect to a plane of the drawing of FIG. 1), and simultaneously the specimen stage 11 is moved at a constant speed in the Y direction so as to effect the sub-scanning operation. In this manner, a raster scanning operation for the specimen 12 is performed by the ultrasonic head 6. While effecting the scanning operation, an ultrasonic beam is projected from the ultrasonic head 6 to the specimen 12, and the ultrasonic beam reflected from the specimen 12 is collected by the ultrasonic head so as to be converted into an electric signal. The thus converted electric signal is suitably processed to obtain an image signal, and the image signal is further supplied to a monitor so as to display an ultrasonic image.

When the optical observation is to be performed in succession after the ultrasonic observation is ended, the slide plate 3 is manually moved in the Y direction by such a distance that the optical axis of the objective lens 4 comes near the observation axis of the microscope. It is preferable that the optical axis of the objective lens 4 is made completely identical with the observation axis of the microscope so that the specimen 12 is kept on the optical axis of the microscope. In this case, since the moving distance is limited by the click mechanism arranged between the slide plate 3 and the arm 2, it is possible to effect the positioning operation of the objective lens 4 simply and accurately. The slide plate 3 has a hole for transmitting a light between the objective lens 4 and the lens-barrel 7, and thus an illumination light emitted from the light source 9 can be introduced onto a surface of the specimen 12 through the light transmitter 8, the lens-barrel 7 and the objective lens 4. Therefore, a light flux reflected from the surface of the specimen 12 can be observed by means of the objective lens 4, the hole formed in the slide plate 3, the lens-barrel 7 and the eyepiece 10. In this manner, according to the invention the ultrasonic head 6 and the optical head 4 are separated by a predetermined spacing in the Y direction on the slide plate 3 arranged slidably in the Y direction and the slide plate 3 is slidable over the distance substantially equal to said spacing, and therefore, it is possible to position the heads accurately in an easy manner without moving the specimen stage 11.

Figure 3:
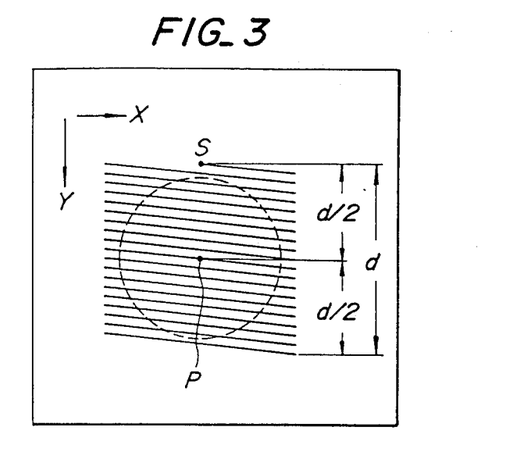
FIG. 3 is a schematic view depicting a scanning region of the ultrasonic observation and a visual field of the optical observation.

Finally, the operation of setting a moving distance of the slide plate 3 will be explained. FIG. 3 is a schematic view showing a scanning region of the ultrasonic head 6 and a visual field of the objective lens 4 on the specimen. In FIG. 3, the solid line illustrates a scanning line of the ultrasonic head 6, and the dotted circle depicts the visual field observed by the objective lens 4. The ultrasonic head 6 starts the scanning operation from a start position S and scans a substantially square region to form a square raster. The visual field observed by the objective lens 4 is a substantially circular region in which the observation axis P of the microscope is positioned at a center of the scanning region of the ultrasonic head 6.

Figure 4A:
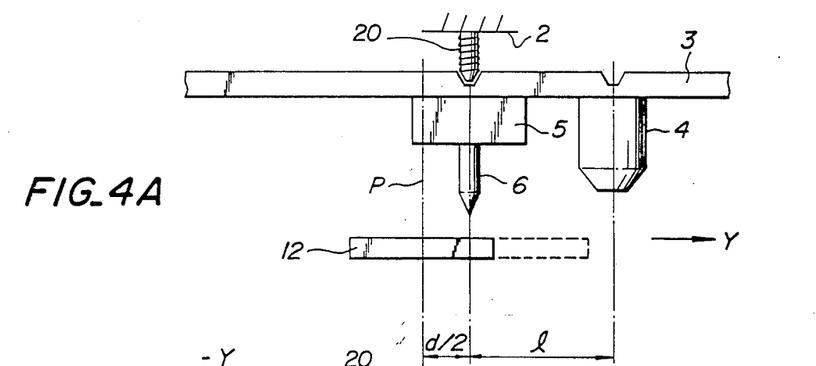
FIGS. 4A and 4B are schematic views showing a moving distance of a slide plate.
Figure 4B:
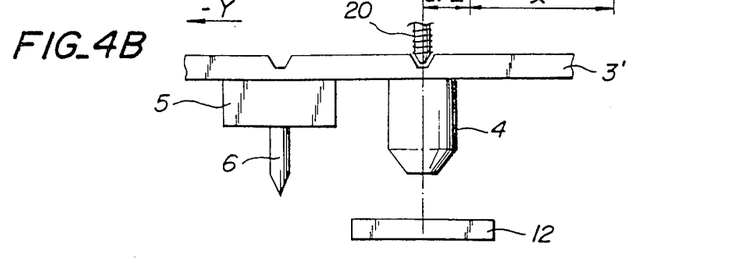

Therefore, as can be seen from FIG. 3, in order to make identical the scanning region of the ultrasonic head 6 with the visual field of the objective lens 4, the optical axis must be shifted from the start position S by a distance d/2, where d is the sub-scanning distance of the ultrasonic head 6. FIGS. 4A and 4B are schematic views showing the moving distance of the slide plate 3 for positioning the head to the observing position, and represent arranging positions in case of the ultrasonic observation and the optical observation, respectively. In these embodiments, the specimen 12 is arranged on the axis of the ultrasonic microscope, the spacing between the ultrasonic head 6 and the optical head 4 is l, the sub-scanning distance of the ultrasonic observation is d, and the specimen stage 11 is movable by the distance d in the Y direction during the ultrasonic observation. Moreover, in case of effecting the ultrasonic observation, the ultrasonic head 6 has to be deviated from the observation axis P of the microscope (represented by the one-dotted chain line) by the distance d/2 in the Y direction, and in case of effecting the optical observation the observation axis P of the microscope should be made completely identical with the optical axis of the objective lens 4. Therefore, when the optical observation is performed after the ultrasonic observation is ended, the slide plate 3 is moved by the distance l+d/2 in the −Y direction. Further, when the ultrasonic is ended, the slide plate 3 is moved by the distance l+d/2 in the Y direction. In the embodiment mentioned above, the sub-scanning is performed in the Y direction, but it is possible to effect the sub-scanning in the −Y direction. In this case, the slide plate 3 must be moved by the distance l−d/2. According to the invention, since the movement of the slide plate 3 is limited between the two predetermined positions by means of the click mechanism arranged between the arm 2 and the slide plate 3, the operator can move the slide plate 3 in the Y direction or the −Y direction accurately by the distance mentioned above, so that it is possible to position each head easily, promptly and accurately into the desired observing positions. It should be noted that the slide plate holding the ultrasonic head and optical head may be moved in the Y direction not only manually, but also automatically by using a suitable driving device.

As mentioned above, according to the invention, it is possible to observe the same region of the specimen both in case of the ultrasonic observation and the optical observation in such an easy operation that the slide plate on which the ultrasonic head and the optical head are provided is moved in the Y direction or the −Y direction. Therefore, the ultrasonic observation accurately corresponds to the optical observation. Moreover, since the slide plate moves only linearly in the Y direction, the construction can be made extremely simple and also the positioning accuracy can be improved.

Figure 5:
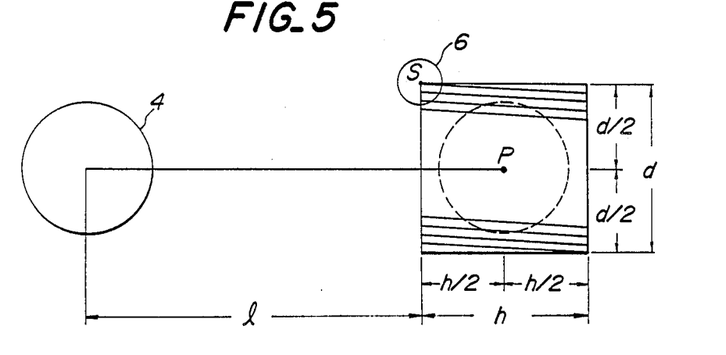
FIG. 5 is a schematic view of another embodiment of the present invention.
Figure 6:
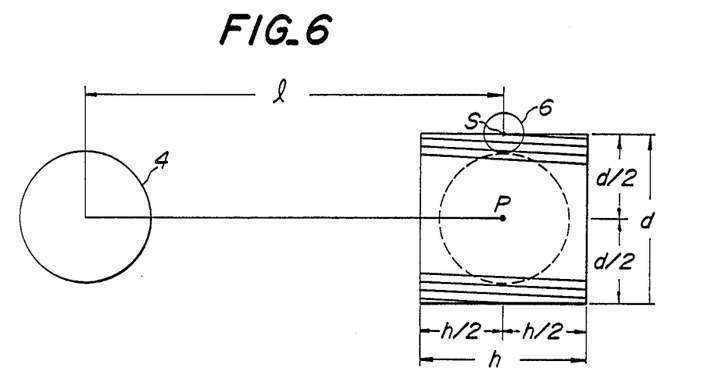
FIG. 6 is a schematic view of yet another embodiment of the present invention.

FIGS. 5 and 6 are schematic views respectively showing one embodiment of using the ultrasonic head according to the invention. In these embodiments shown in FIGS. 5 and 6, the main scanning direction of the ultrasonic head 6 is substantially parallel to the plate moving direction. In the embodiment shown in FIG. 5, a starting point S of the raster scanning is set to a left-uppermost portion of the raster image. Therefore, the center axis of the ultrasonic head 6 is shifted from the center axis of the optical lens 4 by l in the main-scanning direction and by d/2 in the sub-scanning direction. Moreover, in the embodiment shown in FIG. 6, the starting point S of the raster scanning is positioned at a center-uppermost portion of the raster image. Therefore, the center axis of the ultrasonic head 6 is shifted from the center axis of the optical lens 4 by $$l + \frac{h}{2}$$

in the main-scanning direction and by d/2 in the sub-scanning direction.

Figure 7:
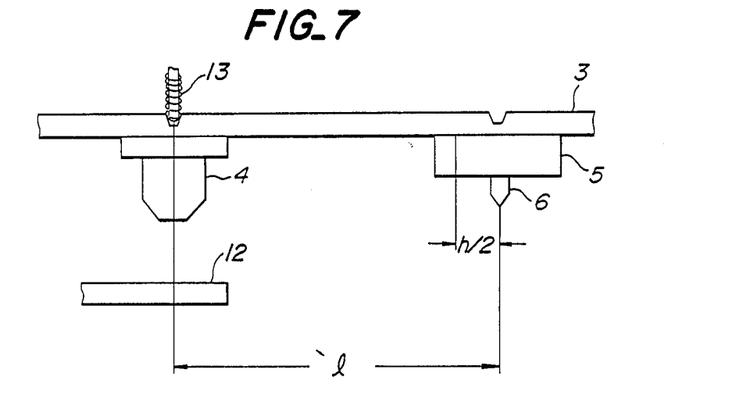
FIG. 7 is a schematic view showing the positioning mechanism of FIG. 6.

FIG. 7 is a schematic view showing a positional relation between the ultrasonic head 6 and the optical lens 4 in the embodiment shown in FIG. 6, and the portions in FIG. 7 similar to those shown in FIG. 4A are denoted by the same reference numerals used in FIG. 4A and the explanations thereof are omitted here. In this embodiment, a click mechanism 13 arranged between an arm of the microscope and the slide plate 3 is further provided for limiting the movement of the slide plate 3.

Figure 8A:
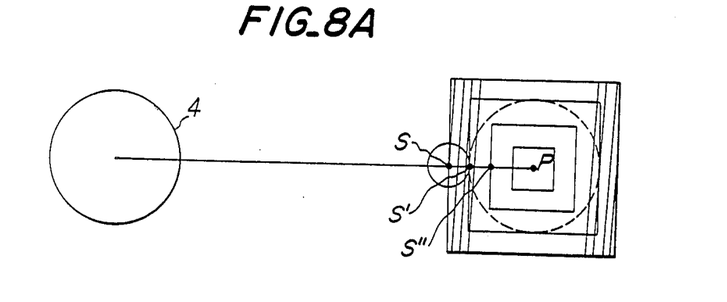
FIGS. 8A and 8B are schematic views of another embodiment of the present invention including magnification.
Figure 8B:
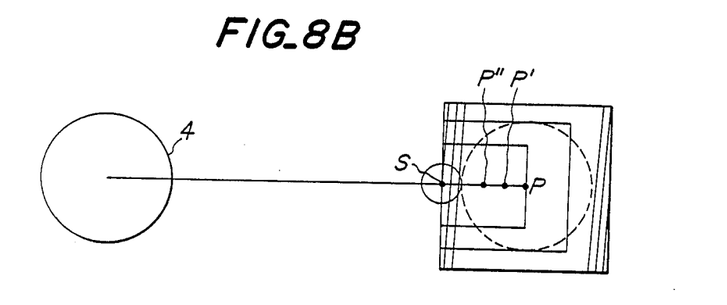

FIGS. 8A and 8B are schematic views respectively showing one embodiment in case of exchanging the ultrasonic head in accordance with the magnification. In FIG. 8A, the center of the raster image is substantially equal to that of the optical image. In this case, during the observation by the optical lens 4, the center P of the optical lens 4 is always fixed regardless of the magnification, while during the observation by the ultrasonic head the specimen stage is moved in the sub-scanning direction so as to change the starting point S of the raster scanning into the position S' or S" in accordance with the magnification after the stage is fixed by the click mechanism if the click mechanism is adapted. Contrary to this, in the embodiment shown in FIG. 8B, left-side edges of each raster image are identical with each other regardless of the magnification. In this case, during the observation by the ultrasonic head, the starting point S of the raster scanning is always fixed regardless of the magnification, while during the observation by the optical lens 4 the specimen stage is moved in the sub-scanning direction so as to change the center position P of the optical lens into the position P' or P" in accordance with the magnification.

In the embodiments mentioned above, the positional relation between the raster image and the optical image is adjusted by moving the specimen stage. However, it is possible to move the slide plate while the specimen stage is fixed, or it is possible to vary the positional relation between the optical lens and the ultrasonic head in the slide plate while the specimen stage is fixed. This achieves the desired positional relation between the raster image and the optical image.

Figure 9:
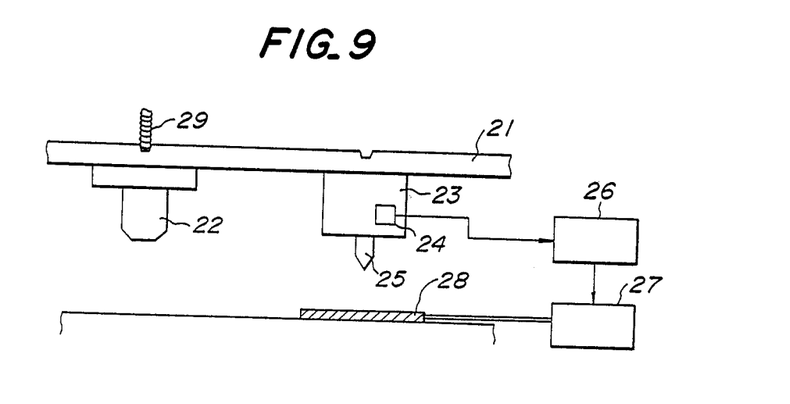
FIG. 9 is a schematic view of a mechanism for moving the specimen stage during magnification according to the present invention.

FIG. 9 is a schematic view showing one embodiment of a device for effecting the movement of the specimen state in accordance with the magnification. In this embodiment, a magnification detector 24 is arranged in a vibrator 23 having a detachable ultrasonic head 25 provided apart from an optical lens 22 on a slide plate 21, and the magnification of the ultrasonic head 25 is automatically detected every time the ultrasonic head 25 is exchanged. Then, a moving distance of a specimen stage 28 is calculated on the basis of the detected magnification by a controller 26, and then the specimen stage 28 is moved by a pulse motor 27. In this case, all the operations mentioned above are performed after the slide plate 21 is moved and fixed by a click mechanism 29.

Figure 10:
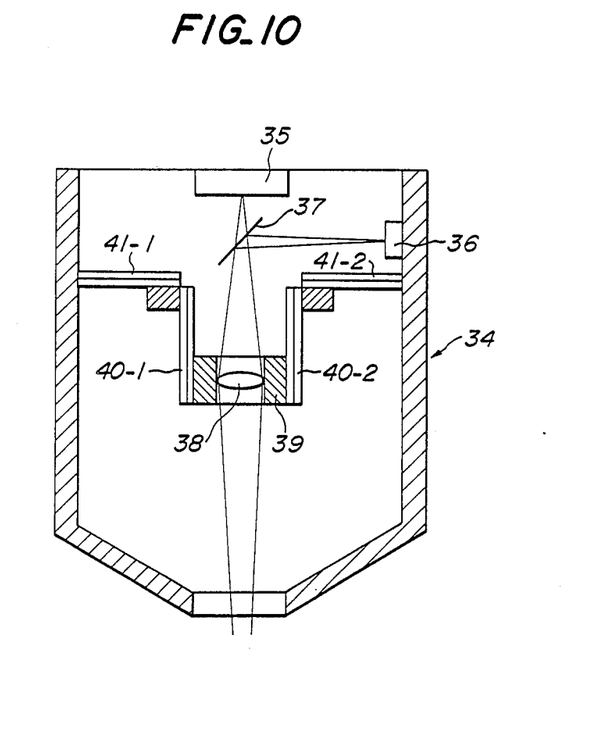
FIG. 10 is a schematic view of another embodiment of the present invention including a laser head.

FIG. 10 is a schematic view showing one embodiment of a detachable laser head for effecting the raster scanning. In this embodiment, a laser light source 35 and a light receiving element 36 are accommodated in the laser head 34. A light emitted from the laser light source 35 is focussed on the specimen (not shown) through a half mirror 37 and an objective lens 38. Then, a light reflected on the specimen is further reflected by the half mirror 37 through the objective lens 38 and is made incident upon the light receiving element 36. The objective lens 38 is supported by a holder 39 in the manner that the objective lens 38 can be vibrated in a two-dimensional direction by means of piezoelectric elements 40-1, 40-2 and 41-1, 41-2 such as a bimorph cell. In the embodiment shown in FIG. 10, the main-scanning is effected by the piezoelectric element 40-1. 40-2; the sub-scanning is effected by moving the specimen stage (not shown); and an auto-focus operation is effected by the piezoelectric elements 41-1, 41-2. Also in this case, it is sufficient that the center of the optical image is always identical with the center of the raster image obtained by the laser head regardless of the magnification. Therefore, all the operations explained above for the ultrasonic head can be entirely applied to the embodiment using the laser head.

Further, according to the invention, the optical lens, the ultrasonic lens and the laser head or further additional lenses can be arranged on the same slide plate if two of them can satisfy the positional relation between them.

What is claimed is:

1. A microscope comprising an optical head for observing an optical image of a specimen and at least one additional head for observing a raster image of the specimen on a specimen stage by scanning the specimen in a main-scanning direction and in a sub-scanning direction substantially perpendicular to the main-scanning direction, comprising a supporting means for supporting said additional head and optical head arranged separately from each other by a predetermined distance, said supporting means being slidable in a such manner that a center point of a raster image field is made identical with a center point of an optical image field, wherein said supporting means is slidable in a direction substantially parallel to the sub-scanning direction.

2. A microscope according to claim 1, wherein said distance along which the supporting means is slidable is set to a sum of said spacing in the sub-scanning direction between said optical head and additional head and a half of a sub-scanning distance of said additional head.

3. A microscope according to claim 1, wherein said distance along which the supporting means is slidable is set to a spacing in the sub-scanning direction between said optical head and additional head less half of a sub-scanning distance of said additional head.

4. A microscope according to claim 1, wherein the supporting means is movably secured to an arm of the microscope and the movement of the supporting means is limited by a click mechanism arranged between said arm and said supporting means.

5. A microscope according to claim 1, wherein said additional head is an ultrasonic head, and the scanning operation for obtaining the raster image is effected by vibrating the ultrasonic head in the main-scanning direction and by moving said specimen stage in the sub-scanning direction.

6. A microscope according to claim 1, wherein said additional head is a laser head, and the scanning by vibrating a laser beam emitted from an objective lens in the main-scanning direction and by moving said specimen stage in the sub-scanning direction.

7. A microscope according to claim 6, wherein said vibration of the laser beam is effected by a piezoelectric element device for moving the objective lens in the main scanning direction in the laser head.

8. A microscope according to claim 6, wherein an auto-focus operation of said objective lens is effected by another piezoelectric element device for moving the objective lens in the optical axis direction thereof.

9. A microscope comprising an optical head for observing an optical image of a specimen and at least one additional head for observing a raster image of the specimen on a specimen stage by scanning the specimen in a main-scanning direction and in a sub-scanning direction substantially perpendicular to the main-scanning direction, comprising a supporting means for supporting said additional head and optical head arranged separately from each other by a predetermined distance, said supporting means being slidable in a such manner that a center point of a raster image field is made identical with a center point of an optical image field, wherein said supporting means is slidable in a direction substantially parallel to the main-scanning direction.

10. A microscope according to claim 9, wherein said distance along which the supporting means is slidable is set to a sum of the spacing in the main-scanning direction between said optical head and said additional head and a half of a main-scanning distance of said additional head.

11. A microscope according to claim 9, wherein said distance along which the supporting means is slidable is set to a spacing in the main-scanning direction between said optical head and additional head subtracted by a half of a main-scanning distance of said additional head.

12. A microscope according to claim 9, wherein said distance along which the supporting means is slidable is set to the spacing in the main-scanning direction between said optical head and said additional head.

13. A microscope comprising an optical head for observing an optical image of a specimen and at least one additional head for observing a raster image of the specimen on a specimen stage by scanning the specimen in a main-scanning direction and in a sub-scanning direction substantially perpendicular to the main-scanning direction, comprising a supporting means for supporting said additional head and optical head arranged separately from each other by a predetermined distance, said supporting means being slidable in a such manner that a center point of a raster image field is made identical with a center point of an optical image field, wherein relative positional relations among said optical head, additional head and specimen stage are further varied in accordance with a magnification of a raster image to be observed by said additional head.

14. A microscope according to claim 13, wherein said supporting means is always moved by a predetermined distance regardless of the magnification and said specimen stage is moved by a predetermined distance in accordance with the magnification.

15. A microscope according to claim 13, further comprising a magnification detector provided in said additional head for detecting the magnification of said additional head; a controller for determining said predetermined distance on the basis of the detected magnification; and a motor for driving said specimen stage in the sub-scanning direction by said predetermined distance.

* * * * *